April 15, 1941.   R. P. COLWILL   2,238,247
BEET HARVESTING AND TOPPING MACHINE
Filed Aug. 28, 1939   8 Sheets-Sheet 1

R. P. Colwill, Inventor

By Hiram A. Sturges, Attorney

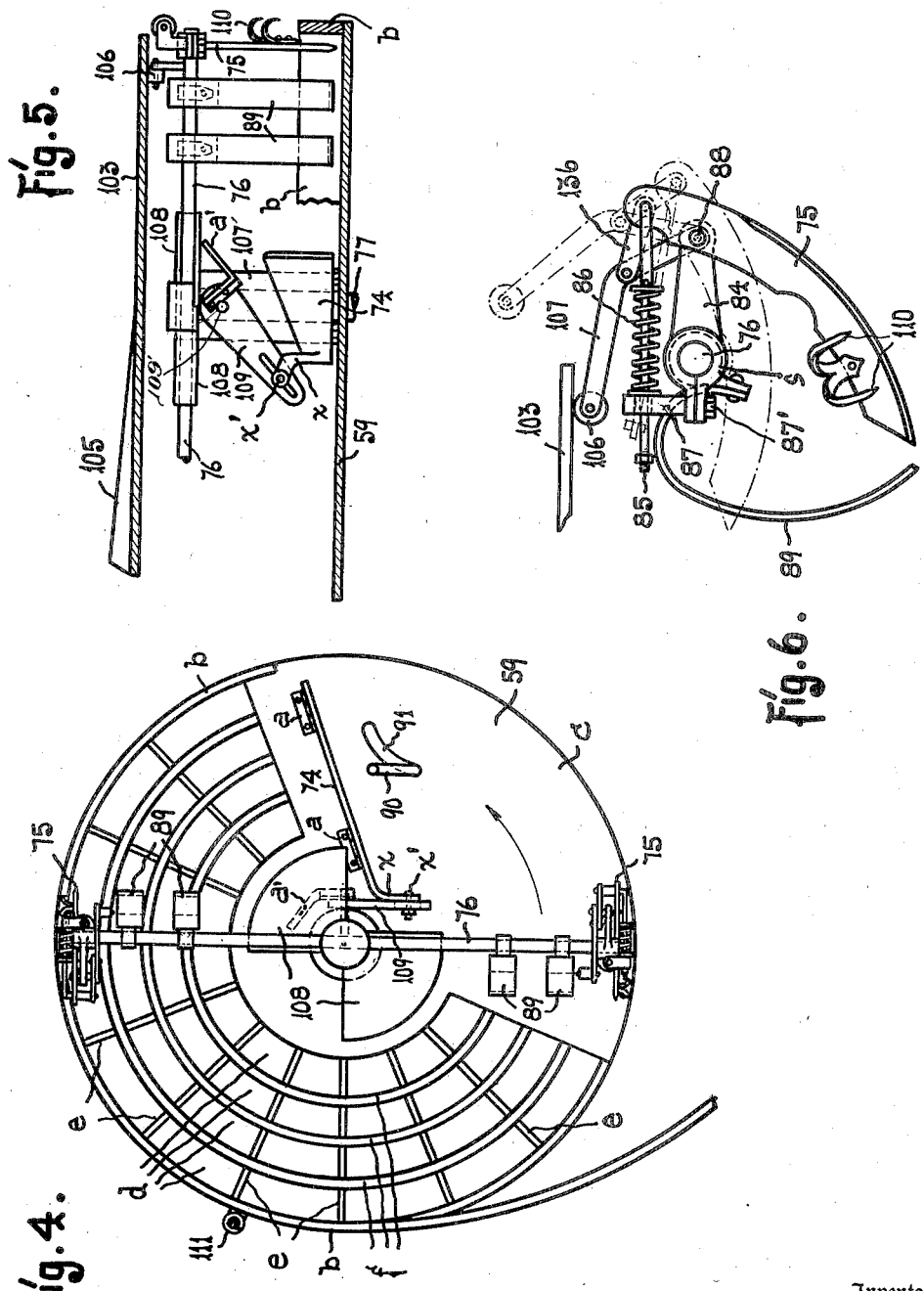

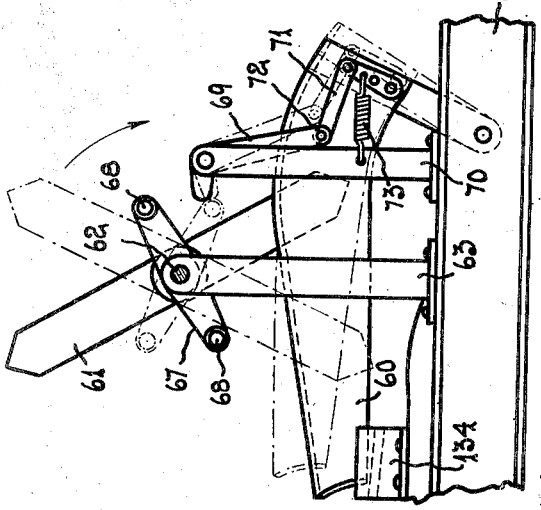

April 15, 1941.   R. P. COLWILL   2,238,247
BEET HARVESTING AND TOPPING MACHINE
Filed Aug. 28, 1939   8 Sheets-Sheet 6
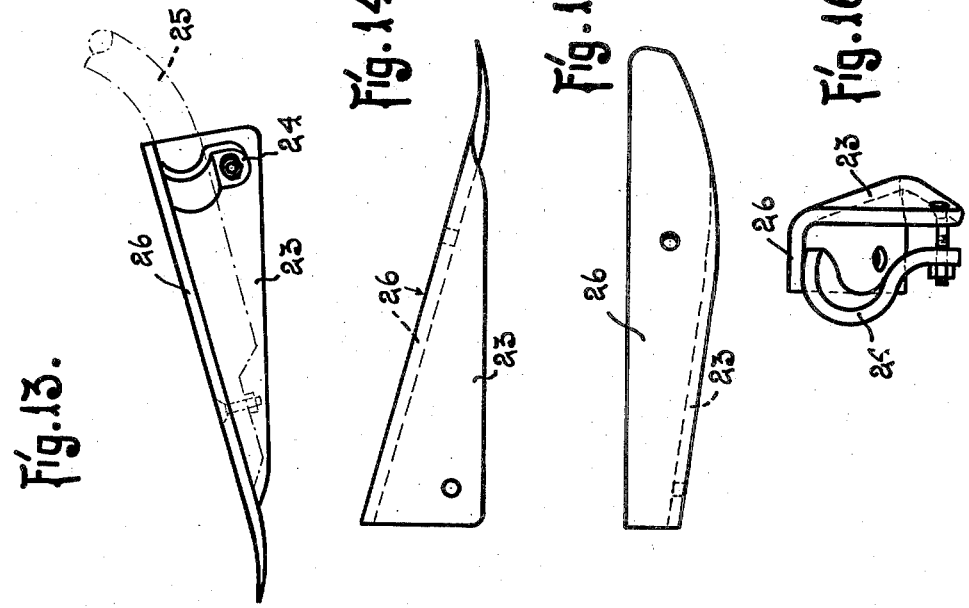
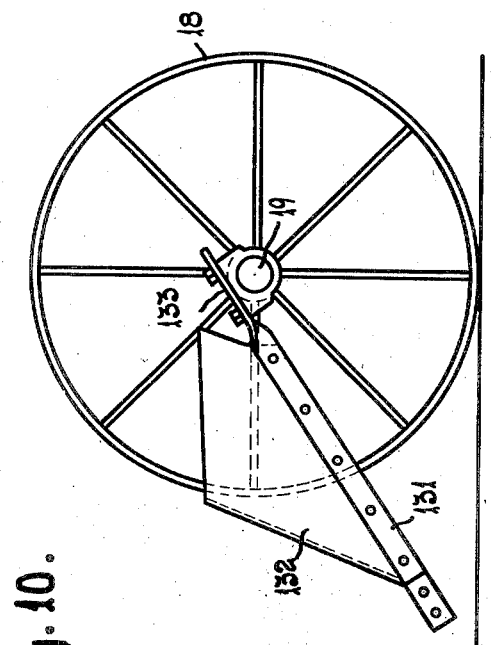
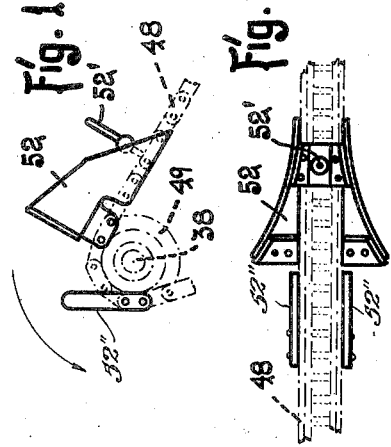
Inventor
R.P. Colwill,
By Hiram A. Sturges, Attorney

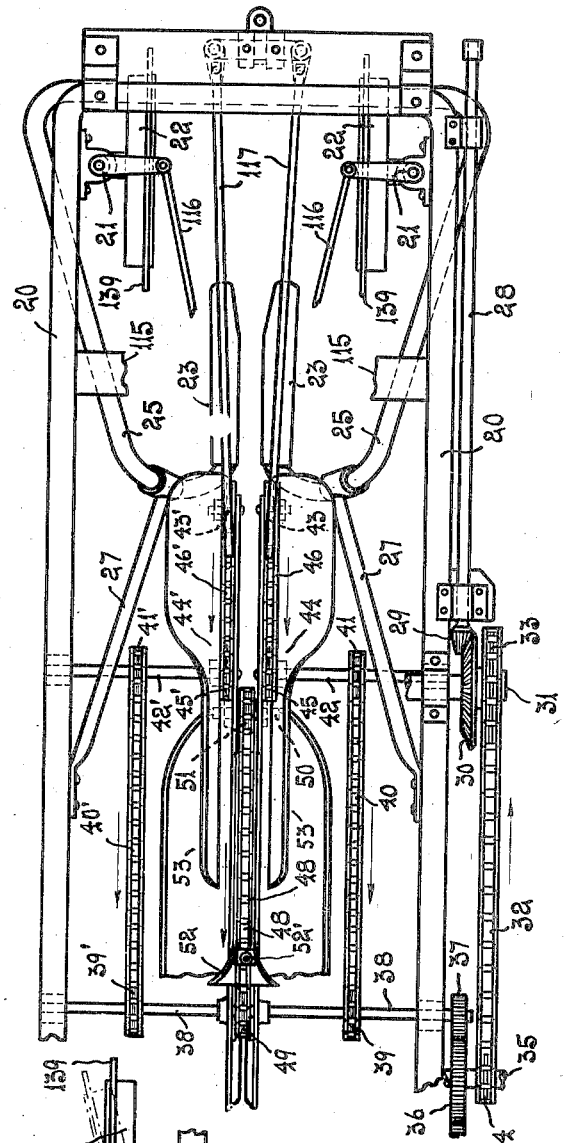
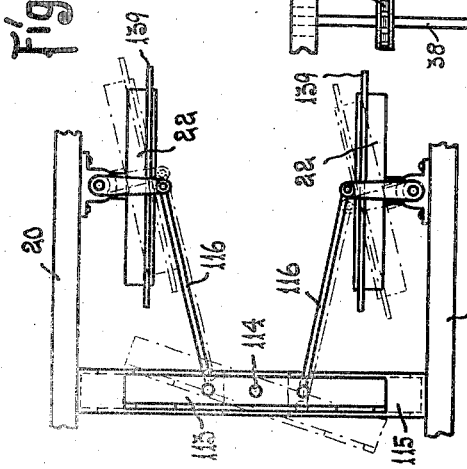

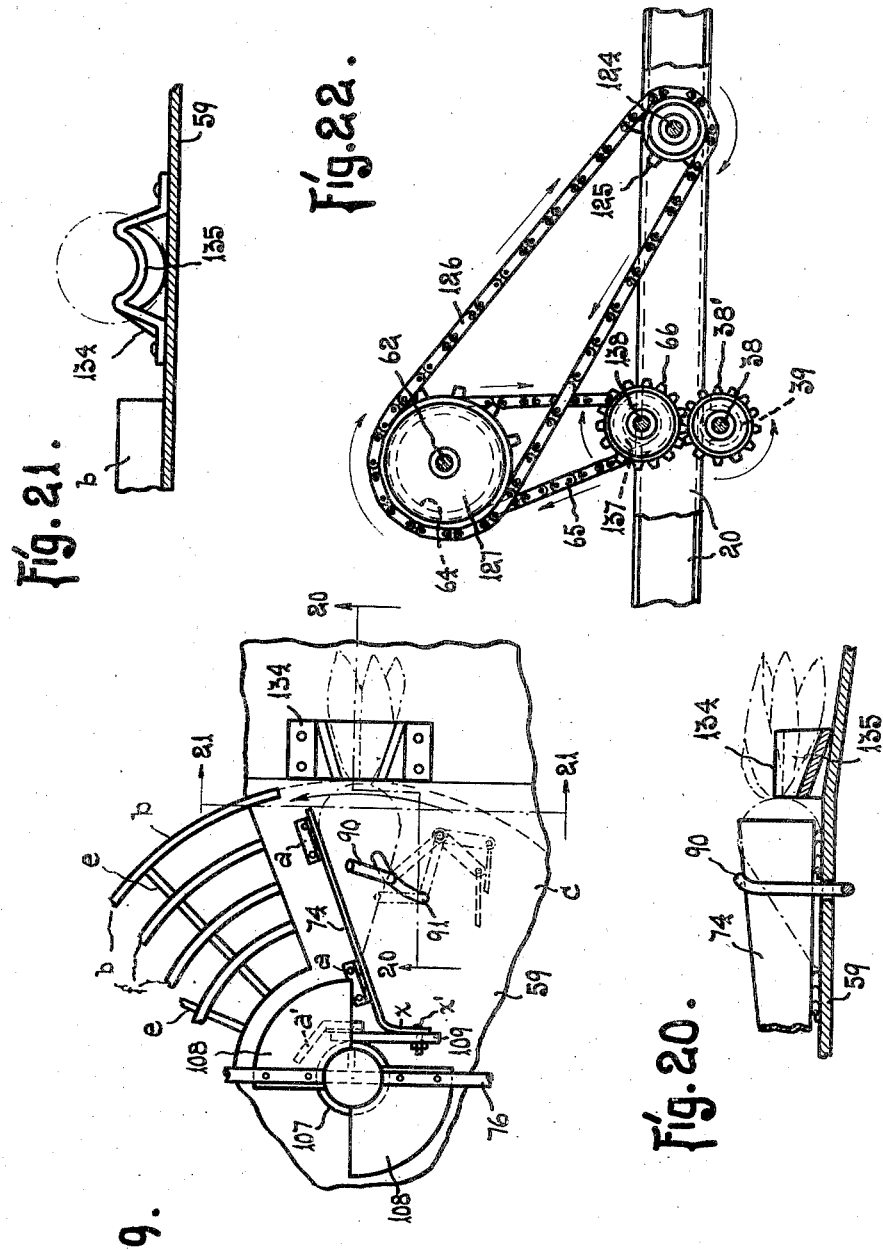

Patented Apr. 15, 1941

2,238,247

UNITED STATES PATENT OFFICE 2,238,247

BEET HARVESTING AND TOPPING MACHINE

Richard P. Colwill, Omaha, Nebr.

Application August 28, 1939, Serial No. 292,175

11 Claims. (Cl. 55—9)

This invention relates to a beet harvesting machine of that class which includes a vehicle arranged for movements along the beet rows and equipped with mechanism for removing the beets in succession from the ground, elevating them to an operating platform on the machine, removing the leaves from the beets and delivering the beets and leaves in separated condition.

The principal object of the present invention is to provide new and automatic means for a control of the movements of the beets through the machine, so that the leaves will be removed accurately close to the heads, it being well known that, in the production of beet-sugar, the valuable part of each beet is its upper end portion, and this part should not be cut away or wasted.

Other objects will appear in a full description herein. The invention consists of the new and useful construction, combination and arrangement of parts as described herein and claimed, and illustrated in the accompanying drawings, it being understood that changes may be made in form, size, proportions of parts and minor details, said changes being within the scope of the invention as claimed.

In the drawings, Fig. 1 is a view of the machine in longitudinal section, the operating platform being broken away.

Fig. 2 is a view of the machine in side elevation, the rear part thereof being broken away. Fig. 3 is a plan view of the machine on line 3—3 of Fig. 2, the operating platform being added.

Fig. 4 is a plan view showing the operating platform and parts mounted thereon, the cover thereof being removed. Fig. 5 is a broken away detail view in section showing a part of the operating platform and its cover, and parts mounted thereon. Fig. 6 is a detail view in side elevation showing a knife of preferred form and mounting therefor.

Fig. 7 is a detail in side elevation showing an aligning-chute and parts therefore used in delivering beets of varying proportions to the operating platform.

Fig. 8 is a detail in section relating to the operating platform, being a view on line 8—8 of Fig. 9.

Fig. 9 is a plan view of parts on line 9—9 of Fig. 8.

Fig. 10 is a side view of an axle attachment for the "near" wheel of the machine.

Fig. 11 is a detail relating to Fig. 1 showing a lifting-lug and a pressure lug for a sprocket chain and Fig. 12 is a plan view of the same.

Figure 1:
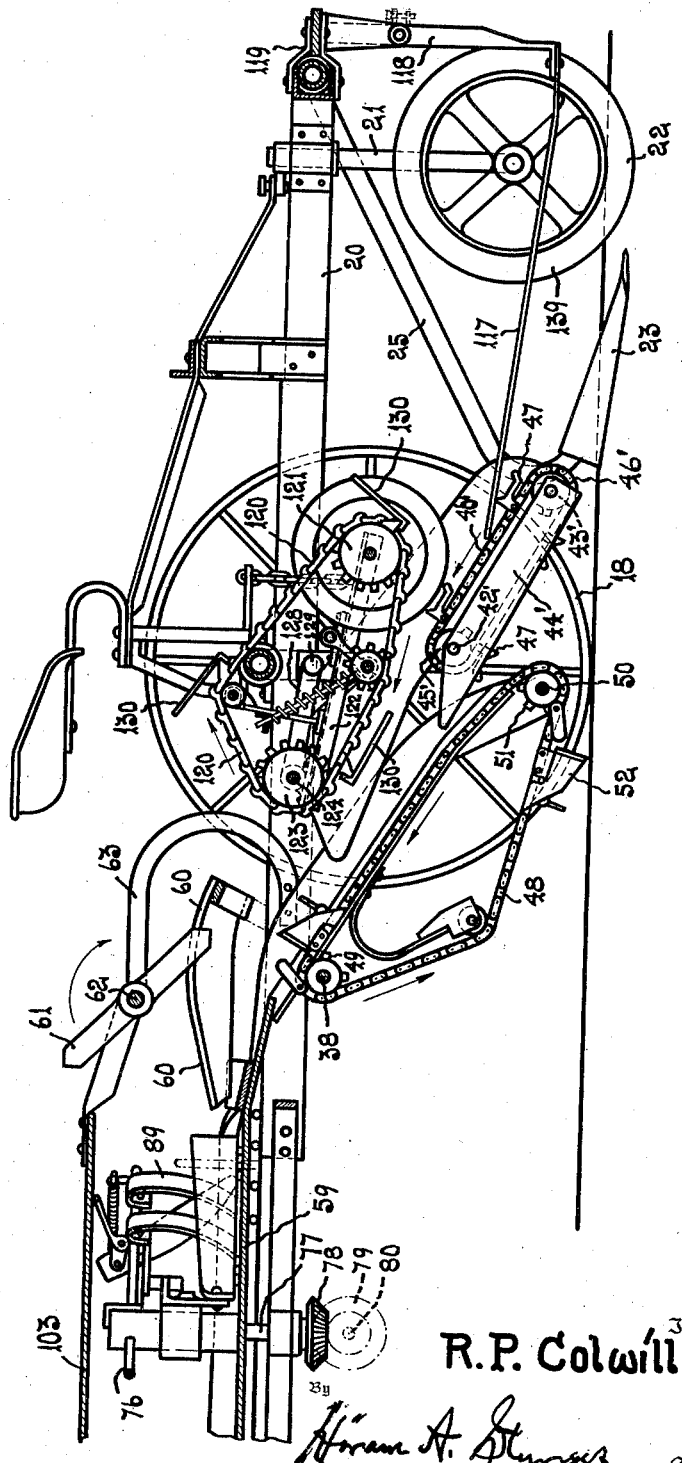
Figure 2:
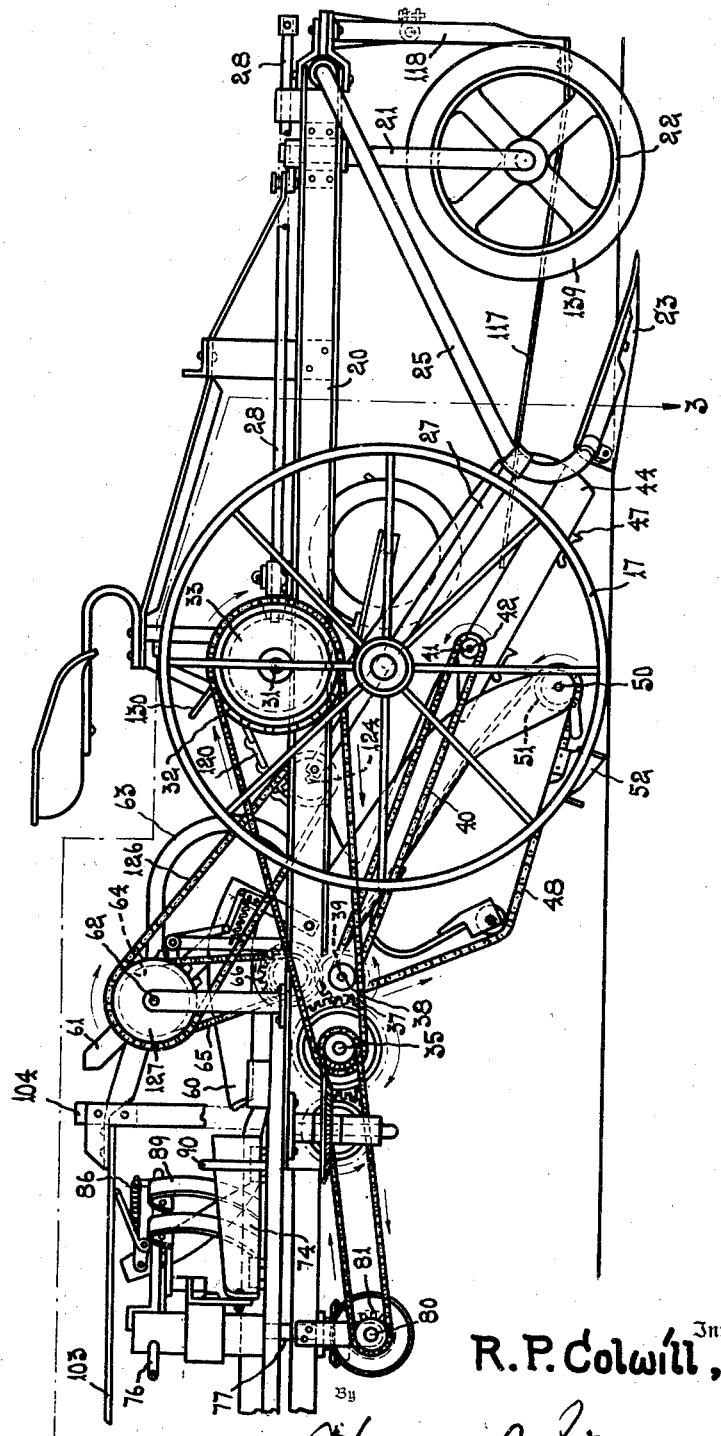

Figs. 13–16 are detail views relating to a two-part furrow-plow. Fig. 13 is a view of the inner side of one of the plow-members. Fig. 14 is a view of the outer side of the same.

Fig. 15 is a plan view of the plow-member shown in Fig. 14, and Fig. 16 is an end view of the plow-member shown in Fig. 13.

Fig. 17 is a plan view showing the front of the machine frame and parts supported thereby. Fig. 18 is a plan view showing means for steering.

Fig. 19 is a plan view showing a part of an operating platform provided with beet-adjusting devices. Fig. 20 is a sectional view on line 20—20 of Fig. 19 to show an aligning-member. Fig. 21 is a sectional view on line 21—21 of Fig. 19 showing the aligning-member. Fig. 22 is a detail view showing parts of the mechanism for moving beets to the operating platform.

Referring now to the drawings for a more particular description, the invention is shown and described in connection with a vehicle preferably arranged as a trailer and steered by an operator, the power for moving the mechanism thereon being provided by the same motor as used on the power-vehicle which draws the trailer.

The trailer is provided with a pair of wheels 17 and 18 which are journalled on an axle 19, a pair of side-bars 20 mounted on the axle being parts of the machine frame.

At the front end of each side-bar 20 is provided a coupling device 21 which provides mountings for a pair of ground wheels 22.

Figure 3:
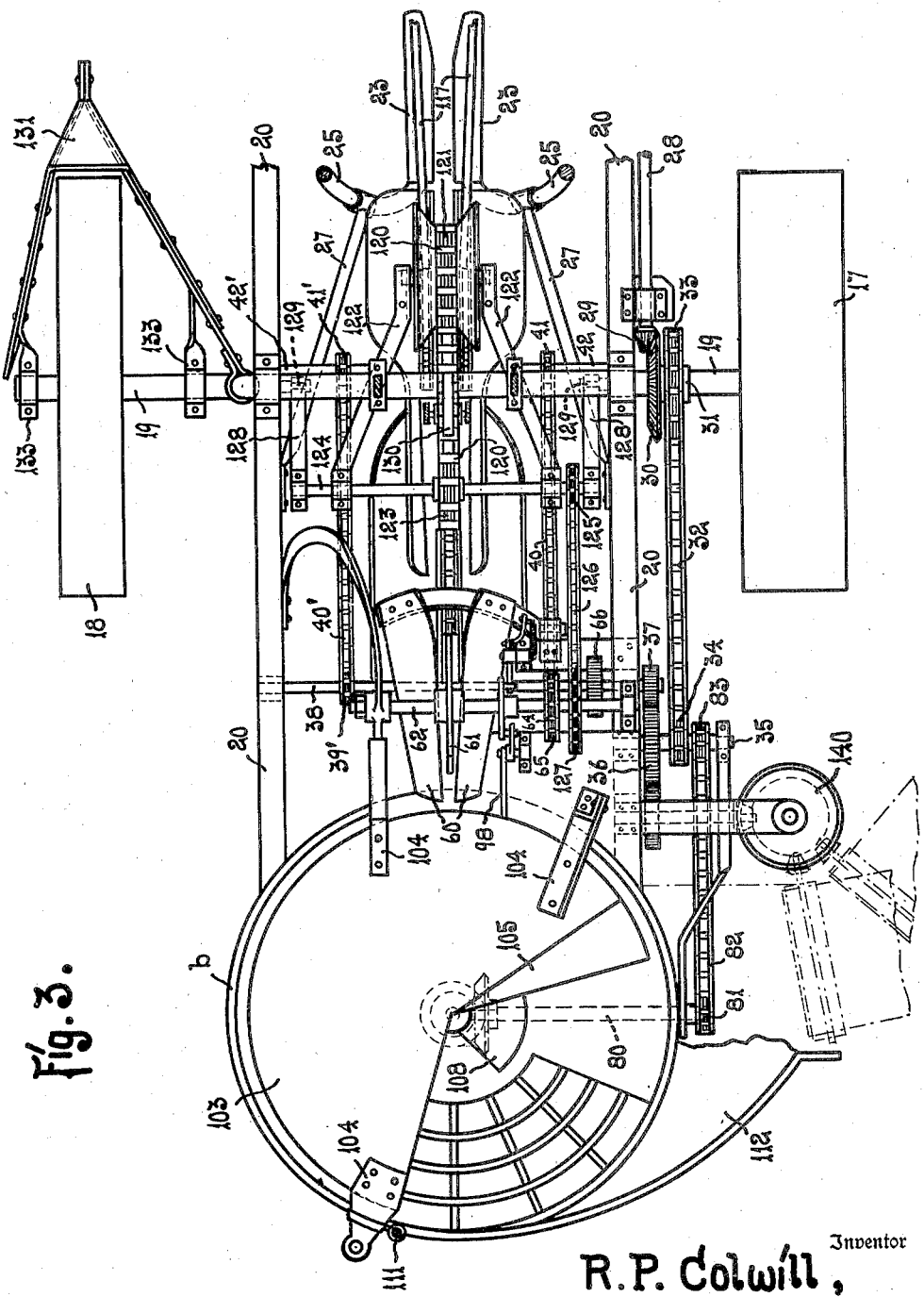

I provide a two-part plow for dislodging the beets from the ground, the two-parts 23 being of uniform shape in all respects and disposed side-by-side, convergingly, as shown in Fig. 3 of the drawings.

Each one-half part of the plow consists of a metallic plate of convergent form from its base to its front end, as best shown in Figs. 13 and 14, a clamping-member 24 being secured to each member 23 for securing it firmly to a curved arm or brace-bar 25, the latter being carried by the side-bars 20 of the machine frame. Numerals 26 indicate flanges, each extending from the upper part of a plow member to overhang a clamping-member 24, and in order that the plow will be firmly supported, a pair of second braces 27 are provided, each being secured to the machine frame as shown in Figs. 3 and 17.

During the forward movement of the machine, the spaced plow-members at the opposed sides will dislodge the beets and the latter will be disposed in upright position in the channel between the plow-members and will be elevated for treatment as will be described.

The beets are elevated separately from the plow to a circular platform where the leaves are removed. I have shown and prefer the use of two elevators. The first elevator which receives the beets directly from the plow includes a pair of relatively parallel, outwardly inclined side-plates, a pair of sprocket chains disposed side-by-side in spaced relation to form a channel therebetween, each chain of said pair being provided with projections for engaging the beets and arranged to move at uniform speed, the use of the two sprocket chains and the intermediate channel for the first elevator being for the purpose of moving the leaves of each beet into line and knocking off adhesive soil.

Before reaching the operating platform the beets are carried by the second elevator and delivered to a chute which operates to limit their movements or speed and to dispose each beet radially upon the circular platform where it will become gripped and held stationary until the leaves are removed.

Numeral 28 indicates a horizontal, rotatable drive shaft in suitable bearings, having a bevel gear wheel 29 engaging a large bevel gear wheel 30 which is mounted on a stub shaft 31, and by means of a sprocket chain 32 which engages the sprocket wheel 33 and sprocket wheel 34, the stub shaft 35 will be rotated. Power for rotating shaft 28 may be derived from any suitable means.

The shaft 35 is provided with a gear wheel 36 which engages the gear wheel 37 of the shaft 38. The shaft 38 is provided with a sprocket wheel 39 which is engaged by a sprocket chain 40, and this chain also engages a sprocket wheel 41 which is mounted on a stub shaft 42.

Numeral 43 indicates an idler sprocket wheel which is mounted for rotation in a housing-plate 44 of the elevator. Numeral 45 indicates a sprocket wheel which is mounted on the stub shaft 42, and at 46 is indicated a carrier or sprocket chain which engages the sprocket wheels 43 and 45, said chain being provided with curved fingers 47.

The other half of this first elevator is practically the same as described, that is to say, it includes a transversely inclined housing-plate 44' which provides bearings for a stub-shaft 42' on which is mounted a sprocket wheel 45' engaged by a sprocket chain 46', and this sprocket chain 46' also engages an idler sprocket wheel 43' which has bearings in the housing-plate 44'. As thus arranged the stub-shaft 42' will be rotated coincidently with the rotation of stub-shaft 42 by operation of a sprocket chain 40' which engages a sprocket wheel 39' on the rotatable shaft 38 and sprocket wheel 41'.

As thus described it will be noted that the carrier or sprocket chains 40 and 40' operate as a unit in engaging the beets and moving them along in the channel thus formed between the carriers, the beet-leaves moving on the housing-plates 44 and 44'.

Numeral 48 indicates a single carrier or sprocket chain used for the second elevator, said chain 48 co-operating with the sprocket chains or carriers 46 and 46' for moving the beets.

This carrier 48 is moved by actuation of the shaft 38. Numeral 49 indicates a sprocket wheel which is mounted on shaft 38, and at 50 is indicated a shaft provided with an idler sprocket wheel 51, and the sprocket chain 48 engages the sprocket wheels 49 and 51 thereon, and therefore the beets will be moved upwardly on this second elevator.

Numerals 52 indicate projections (Figs. 11–12) which are secured to the chain 48, each projection being provided with a finger 52', said projections being of such form that they will engage the beets to advantage for moving them through the chute 60 (Fig. 1) and upon the platform 59. Numerals 53 indicate inclined housing-plates used in connection with sprocket chain 48.

During operation, the movements of the sprocket chains or carriers 46 and 46', their fingers 47 will cause swinging movements of the beets in arcs approximately of 90 degrees so that, during the movements of the beets on the elevators, the roots will be disposed in advance, relative to their tops or leaves, the operation being that the curved fingers 47 will engage the roots of the beets for causing the swinging movements.

After the beets move from the plow to the elevators their upward movements, against the force of gravity, might cause them to slip downwardly, and therefore, I provide means to prevent any sliding movements of beets on the elevators, as will be explained hereinafter.

The beet-delivery chute 60 is in communication with the platform 59 and leads thereto from the second elevator. In form it is longitudinally convergent. One of the advantages in the use of the chute is to control the movements of the beets as to speed and another use is to maintain and deliver each beet in radial alignment with the circular operating platform 59.

The means for moving the beets from the chute to the platform consist, in part, of a pair of swing-arms 61 mounted on a shaft 62, said shaft having bearings in a frame-member 63, said shaft being provided with a sprocket wheel 64.

The sprocket chain 65 engages a sprocket wheel 137 (shown in dotted lines in Fig. 22) which is mounted on shaft 138, and on shaft 138 is mounted the gear wheel 66 which is in mesh with the gear wheel 38' on the shaft 38 for actuating said arms 61.

The chute is provided with a slot in its top for receiving the arms 61, and is of convergent form toward its discharging end for the reason that the beets differ in size. The chute is normally disposed with its discharging end somewhat below the edge of the platform 59, and when a beet moves into the chute from the second elevator, its root will engage the edge of the platform and will be disposed in radial alignment therewith.

The chute is arranged for upward swinging movements of its discharging end to permit the beets to move onto the platform when struck by one of the arms 61.

For a control of the movements of the beets, the bar which provides the arms 61 is provided with a cross-bar 67 having projections 68 adapted to be engaged by one end of a crank-member 69 pivotally mounted on a post 70, one of the arms of the crank being pivotally mounted on an arm of a second crank-member 71 having a pivotal mounting for one of its arms on the frame and its other arm being pivotally connected at 72 with the crank-member 69.

The crank-member 71 is mounted on the chute at the intake end thereof, and in operation, when a projection 68 engages the crank 69 the chute will swing upwardly to permit the beet to be moved onto the platform subject to the control of a spring 73, the movement of the beet to the platform being effected, coincidently, by action of a swing-arm 61. The spring 73 causes the inner end of the chute to swing downwardly as soon as the beet has been delivered to the platform.

Since the intake end of the chute swings downwardly as described for receiving the beets, the latter will not pass under the chute. Also each beet moved by action of the chain 48 is elevated above said chain by a projection 52, above described, so that it will enter the chute. As an aid in moving the beets into the chute, this chain is provided with pairs of swing-plates 52″ (Figs. 11-12), these being disposed in advance of projections 52, and the beets are in inclined position so that they readily enter the chute.

Each beet will be moved by an end-portion of the swing-bar 61 into contact with a detent-plate 74 which is hinged at $a$ to the upper side of the stationary platform 59 where it will remain until its leaves have been removed by a movable knife.

The platform is circular in plan, and is secured to the frame 20. As best shown in Fig. 4, it is provided at its peripheral edge with an upset rim $b$, and consists of an attenuated plate having a segmental part $c$ and curved apertures $d$ together with radially disposed strips $e$ which engage the lower sides and reinforce the circular strips $f$. This foraminous platform operates to advantage since the beets will move thereon after their tops have been removed, and this treatment tends to cause removal of adhesions and render the beets in clean condition when discharged from the platform.

The leaves of the beets are cut close to the head by means of a pair of knives 75 each carried by an end-portion of a horizontal carrier-bar 76, said bar being mounted at its middle on a vertically disposed rotatable spindle 77.

This spindle is provided at its lower end with a bevel gear wheel 78 (Fig. 1) which engages a similar gear wheel 79 of a horizontal shaft 80 extending to the "off" side of the machine. The shaft 80 is provided at its outer end with a sprocket wheel 81, and by means of a sprocket chain 82 which engages the sprocket wheel 81 and a sprocket wheel 83 which is mounted on the shaft 35, the spindle 77 will be rotated for swinging movements of the carrier-bar 76.

Each knife 75 has a cutting edge of longitudinally curved form as shown in Fig. 6, and is mounted on the carrier-bar 76 by means of a latch 84 and a control-rod 85, the latter being slidingly mounted in the projection 87 of the carrier-bar and pivotally mounted on the end of the knife and permitting a slight swinging movement thereof subject to the action of a spring 86, the latch having a rigid connection at one of its ends with the carrier-bar and a pivotal mounting 88 of its opposite end on the knife; and in operation, when the knife cuts and separates the leaves from a beet it will have a limited swinging movement and will be disposed at a suitable inclination for effective work.

The bar 76 is provided at its ends with downwardly projecting fingers 89 for moving the beets on the platform after the leaves have been removed.

When a beet moves to the platform from the chute it immediately is gripped by a hook 90 and is pressed against the detent-plate 74 to hold it stationary while its top is being removed by action of a knife, said hook having swinging movements, at intervals, for this purpose, through a small opening 91 (Fig. 4).

This hook 90 is provided with an arm 92 having a pivotal mounting 93 on the lower side of the platform 59, a second arm 94 being also mounted on the pivot 93, whereby the arms 92 and 94 operate as a bell-crank.

The movements for the gripper or hook 90 and operating parts therefor are best shown in Figs. 8 and 9.

The gripping movements of the hook 90 are caused by the movements of projections 68 when they engage the arm 95 of a bell-crank pivotally mounted at 96, the arm 97 of the bell-crank being pivotally attached to a pull-and-push rod 98 under control of a spring 99 to which it is attached, a second rod 100 being attached to the spring and mounted on the arm 94; and as described it will be understood that at each upward movement of a projection 68 the arm 95 will be swung upwardly for causing the hook 90 to press the beet against the detent-plate 74 and holding in stationary position until its top has been removed by a knife 75, the action of the spring 99 causing the hook 90 to swing to reverse position. As shown in Fig. 9 the platform 59 is provided with a yoke 101 operating to stabilize the action of the spring 99, and rods 98 and 100, a link 102 providing pivotal mountings at its ends for the rods 98 and 100. The spring 99 is mounted at its respective ends upon the platform 59 and link 102.

Numeral 103 indicates a cover which is disposed above and parallel with the platform 59, and is secured to the platform by suitable supports 104; and as best shown in Fig. 3 this circular cover is of mutilated form since approximately one-third of its area has been cut away, and it has a radially disposed upset edge 105.

A pair of rollers 106 engage the lower side of this cover, each roller being carried by a coupling-strip 107 (Fig. 6) which is flexibly attached to a knife 75, and since each knife is under control of a spring 86 it is obvious that each roller 106 will normally be pressed against the cover 103 to prevent undue vibration of the carrier-bar and knives.

During operation, the swinging movement of the carrier-bar 76 will cause non-contact of the rollers with the lower side of the cover when they reach the open segmental area of the cover, and while it is true that the rollers will swing upwardly to non-operative position by action of the springs 86, they will be moved to operative position by their contact with the inclined radial portion 105 of the cover.

The object in view in providing the roller 106 and its contact, during operation, with the lower side of the cover 103, is to permit the knives 75 to swing upwardly when the fingers 89 of the swing-bar 76 approach the discharge-sheet or spillway 112. In this operation, the beets which are moved on the platform will be carried outwardly by centrifugal force to the spillway 112, and therefore the knives should be lifted or swung upwardly so that they will not interfere with said outward movement to the spillway. When the rollers become disengaged from the cover they will, by action of springs 86, swing to upward positions as shown in dotted lines in Fig. 6, and therefore they will not interfere with the beets in movements to the spillway.

The swinging of the detent-plate on its hinges a to upright or to horizontal positions is best shown in Figs. 4 and 5 of the drawings. The upper part of the spindle 77 has a sleeve 107' secured to the platform 59, said spindle having a pair of opposed, horizontal, segmental contact-plates 108 secured thereto and also secured to the carrier-bar 76. The detent-plate is provided at its inner end with an arm $x$ extending approximately at right-angles therefrom, and upon this arm is pivotally mounted at $x'$ a lever 109, the opposite end of this lever being provided with a finger $a'$.

The lever 199 is pivotally mounted on the stationary sleeve as indicated at 109', and the finger $a'$ will be normally pressed upwardly into contact with the segments 108, and it will be understood that when the carrier-bar swings 90 degrees the lever 109 will swing upwardly from its pivot $x'$, the finger $a'$ moving into the area between the segments 108, the result being that the detent-plate 74 will swing to horizontal position to permit a beet to be carried forwardly by the hangers or fingers 89.

In operation, the lever 199 will have four swinging movements on the pivot 109' during each complete circular movement of the carrier-bar 76 indicated by the arrow in Fig. 4, the finger $a'$ being pressed against a segment 108 for lifting the detent-plate 74 to approximately vertical position. When the finger $a$ is disengaged from the segment 108 the lower end of the lever 109 swings downwardly to permit the detent-plate 74 to swing to horizontal position. While maintained in upright position the plate 74 operates as a support for each beet while its top or foliage is removed by action of a knife 75. For each operation the detent-plate will be moved to horizontal position by the moving fingers 89 carried by the bar 76.

Each knife 75 is provided on its outer side and near its free end with a hook-member or claw 110, and when a knife cuts off the top of a beet the hooks or claw will engage and carry the leaves along on the rim $b$ into engagement with a projection or detaching-pin 111 which removes the beet-leaves from the hooks 110, and this arrangement prevents an accumulation of beet-leaves on the harvester.

After a knife cuts off the leaves the detent-plate swings to a horizontal position and the beet is carried along on the foraminous part of the platform by the fingers 89, and by centrifugal force the beet will be thrown to the discharge sheet or spillway 112 at a side of the harvester.

Steering of the harvester, for the most part, is under control of a tractor or other vehicle (not shown) which provides travel power, but since some of the rows of beets may not be in perfect line, this trailer or harvester is provided with its own steering device, so that the plows 23 will engage in the ground at the opposed sides and partly beneath the beets of a beet-row, this steering device consisting of a foot-bar 113 (Fig. 18) pivotally mounted at its middle, at 114, on a cross-bar 115 of the frame 20, the ends of the foot-bar being provided with links 116 which are attached to the coupling-device 21.

Means are provided for lifting the leaves of the beets in advance of the movement of the plow, said means consisting of a pair of links or strips of heavy wire 117, each disposed above and in the vertical plane of a plow-member 23, their front ends being attached to hangers 118 carried by a yoke 119 which is disposed at the front of the frame 20, the rear ends of the links or wires being secured to the frame of the lower elevator as shown in Fig. 1 of the drawings. By use of this arrangement of parts, the wires 117 will lift and prevent removal of the leaves from the beets so they may be preserved and may lie flatwise on the elevators, this being a great advantage in the control of the movements of the beets while moving on the elevators into the chute 60, the leaves operating as a drag or guide.

To prevent any downward sliding or lagging movements of the beets on the carriers or elevator-chains during operation, I provide a movable, flexible member having the form of a sprocket chain 120, said chain having a rugose surface so that its positive engagements will press the beets downwardly against the carriers or elevator-chains, means also being provided to prevent crushing or injury to the beets regardless of size.

This chain is mounted, in part, on a sprocket wheel 121 which is mounted as an idler on frame-braces 122, said chain also being mounted on a sprocket wheel 123 carried by a rotatable shaft 124, said shaft 124 being also provided with a sprocket wheel 125 which is engaged by a sprocket shain 126 and this chain 126 engages the sprocket wheel 127 mounted on the rotatable shaft 62.

The shaft 124 has bearings at its ends on a pair of arms 128, said arms being adapted to have swinging movements from their pivoted mountings 129 on the machine frame 20. Also the brace arms 122 are swingably mounted on the shaft 124, and therefore the chain 120 may engage small beets which are moving on the first and second elevators to prevent slipping movements thereof, and large beets will not be crushed by said chain 120 for the reason that the shaft 124 is mounted to permit the rocking movements as described. Also the chain 120 is provided at intervals with contact-pads 130, and during operation the latter will gently press the beets and their leaves downwardly against the chains of the two elevators, the leaves of the beets being pressed to a flat condition preparatory to entering the chute 60.

In Figs. 1 and 10 of the drawings is illustrated a leaf-lifting attachment for the "near" wheel of the vehicle. Since this wheel travels in a line between the beet rows this leaf-lifter operates to great advantage in elevating the beet leaves from the ground. In the operation of the present invention the leaves are of assistance in maintaining the beets parallel with the carriers while they move upwardly from the plow, and this attachment tends to protect and prevent the beet leaves from being cut away by action of the vehicle wheel.

For this purpose a V-shaped frame 131 is provided and is disposed with its opposed wings 132 at the sides of said "near" wheel, the ends of the attachment being secured to the axle 19 as indicated at 133 (Fig. 1) in such a manner that its front end will be disposed close to the ground, forwardly of the wheel; and it will be appreciated that after the beet-leaves have been lifted up they may be received upon the pair of supporting-links 117.

The advantages in securing each beet in correct position on the platform 59 so that the moving knife will cut off the beet-top is shown in Figs. 19, 20 and 21 of the drawings. Numeral 134 indicates an aligning-member or supporting-block which is secured to the edge of the platform over which the beets slide when they move thereto from the chute. This member 134 has a concave inclined surface 135, and in operation, each beet will move radially upon the platform against the plate 74 and the gripper-hook 91 will have a swinging movement against the beet and will cause the head of the beet to engage said aligning-member and hold it stationary until a knife 75 removes the top. Since the gripper-hook is spring-controlled small beets as well as large beets will be moved by said hook.

Numerals 139 indicate vertically disposed flanges which are provided for the tires of the pair of leader-wheels 22, the advantage in the use of these flanges being that they loosen the ground at the sides of a beet row so that the plow may readily lift the beets from the ground.

Numeral 140 indicates a power wheel best shown in Fig. 3 of the drawings, this wheel being driven by any suitable connecting mechanism by the rotatable gear wheel 36, said wheel 140 being disposed near the spillway 112, and any suitable conveyor-mechanism may be installed and driven by said wheel 140 for the disposition of beets delivered to the spillway.

Numeral 136 indicates a link (Fig. 6) which is pivotally attached at its ends to the strip 107 and to that end of the knife 75 outwardly of its pivotal mounting 88, and when the roller 106 and latch move from the cover 103, this movement of the latch will cause a movement of the link 136 and thereby the knife will swing on its pivot 88 to inoperative position.

Means are provided for adjusting each knife 75 longitudinally of the swing-bar 76 so that the distance between a knife and the aligning-member 134 may be increased or diminished for topping the beets, and for this purpose each latch 84 (Fig. 6) is provided with a split sleeve s, said sleeve being slidably mounted on the swing-bar for said adjustments, and after an adjustment has been made the nut 87' may be rotated on the threaded end of the rod-supporting block 87 for firmly securing the latch and said knife in adjusted position.

I claim as my invention:

1. In a beet harvesting and topping machine, a vehicle provided with a platform, a chute leading to the platform, a ground-engaging beet-lifting plow carried by the vehicle, a pair of parallel sprocket chains arranged for conducting beets from the plow, a single sprocket chain arranged for conducting beets to the chute from the pair of sprocket chains, a third sprocket chain disposed above in the vertical plane and in operative proximity for pressing beets against the pair of sprocket chains and single sprocket chain, movable mechanism on the vehicle for delivering beets to the platform from the chute, and beet-topping mechanism movable on the platform.

2. In a beet harvesting and topping machine, a vehicle provided with a platform, a chute reciprocating in a vertical plane for delivering beets therefrom to the platform, beet-topping mechanism movable on the platform, a plow carried by the vehicle for lifting beets from the ground, a sprocket chain arranged for receiving and conducting beets from the plow, a second sprocket chain arranged for conducting beets from the first named sprocket chain to the reciprocating chute, and a third sprocket chain provided at intervals with contact-pads and movable in the vertical plane above in operative proximity for pressing beets against the first named sprocket chain and second sprocket chain.

3. In a beet harvesting and topping machine, a vehicle provided with a platform, a chute reciprocating in a vertical plane for delivering beets therefrom to the platform, mechanism movable on the platform for topping said beets, a plow carried by the vehicle for lifting beets from the ground, a sprocket chain arranged for receiving and conducting beets from the plow, a second sprocket chain arranged for conducting beets from the first named sprocket chain to the reciprocating chute, a third sprocket chain provided at intervals with contact-pads and disposed in the vertical plane above, in operative proximity, for pressing beets against the first named sprocket chain and second sprocket chain, and swingable arms axially mounted above and movable through a part of the chute.

4. In a beet harvesting and topping machine, a vehicle provided with a circular platform, a chute extending to the platform and arranged for vertical reciprocation, movable beet-topping mechanism on the platform, a ground-engaging, beet-lifting plow carried by the vehicle, an inclined sprocket chain arranged for receiving and conducting beets from said plow, a second inclined sprocket chain arranged to conduct beets to the chute from the first named sprocket chain and provided at intervals with projections and with pairs of swing-plates in advance of said projections, and a plurality of arms axially mounted above and movable into and through a part of the chute.

5. In a beet harvesting and topping machine, a vehicle provided with a circular platform, a chute extending radially to the platform and arranged for reciprocation in a vertical plane, beet-topping mechanism movable on the platform, a beet-lifting plow carried by the vehicle, a movable sprocket chain cooperating with the plow, a second movable sprocket chain intermediate the chute and first named sprocket chain provided at intervals with projections and with pairs of swing-plates in advance of the projections, a third movable sprocket chain provided at intervals with contact-pads and disposed adjacently above the first named sprocket chain and second sprocket chain, and a pair of arms axially mounted above and movable through a part of said chute.

6. In a beet harvesting and topping machine, a vehicle provided with a circular platform, a chute leading radially to the platform, an upright rotatable spindle centrally and extending above the platform, a pair of opposed, segmental plates movable with the spindle, a pair of radially disposed horizontal arms each carried by the spindle and provided at its end with a beet-topping knife-member, a sleeve loosely mounted on the spindle and secured to the platform, a detent-plate hingeably mounted on the platform and provided with an arm, a link having pivotal connections with the sleeve and arm of the detent-plate and having a finger for alternate engagements with the segmental plates to cause swinging movements of the detent-plate, mechanism on the vehicle for conducting beets to the chute, axially mounted arms movable for moving beets from the chute to the platform, and a hook-member movable on the platform for pressing beets against the detent-plate to beet-topping position.

7. In a beet harvesting and topping machine, a vehicle having a circular platform provided with a supporting-block at its periphery, a chute extending to the platform in line with the supporting-block, a rotatable spindle centrally of the platform, mechanism movable on the vehicle for conducting beets to the chute, mechanism movable on the vehicle for moving beets from the chute to the platform into abutting position relative to the supporting-block, a hook-member movable on the platform for engaging and holding beets in stationary position thereon, a carrier-bar movable with the spindle, and knife-members movable with the carrier-bar for engaging the hook-engaged beets on the platform.

8. In a beet harvesting and topping machine, a vehicle provided with a horizontal platform, an upright rotatable spindle extending above the platform, a chute extending to the platform, movable mechanism on the vehicle for conducting beets to the chute, movable, resiliently controlled mechanism for moving beets to the platform from the chute, a movable beet-gripping hook on the platform, a horizontal carrier-bar movable with the spindle, and a pair of spring-controlled, beet-engaging knife-members movable with said carrier-bar.

9. In a beet harvesting and topping machine, a vehicle provided with a horizontal platform, a rotatable spindle extending above the platform, a horizontal carrier-bar mounted for circular movements by actuation of the spindle, a detent-plate swingably mounted on the platform, mechanism on the platform for controlling the movements of the detent-plate, a beet receiving chute on the vehicle, movable mechanism on the vehicle for conducting beets from the chute into engagement with the detent-plate, a movable spring-controlled hook member on the platform for pressing beets against the detent-plate, and spring-controlled knife-members movable with the carrier-bar for engagements with said beets.

10. In a beet harvesting and topping machine, a vehicle provided with a circular platform, an upright, rotatable spindle centrally of the platform, a carrier-bar mounted midway between its ends upon the spindle, a detent-plate swingably mounted on the platform, mechanism movable on the platform for controlling the movements of the detent-plate, a radially disposed beet-receiving chute leading to the platform, spring-controlled mechanism on the vehicle for moving beets from the chute into engagement with the detent-plate, a beet-engaging hook-member movable on the platform, and knife-members mounted on the carrier-bar for engaging said hook-engaged beets.

11. In a beet harvesting and topping machine, a vehicle having a circular platform provided with a beet supporting-block at its edge, a beet-receiving chute extending to the platform in line with said block, a rotatable spindle extending above the platform, spring-controlled mechanism movable on the vehicle for moving beets from the chute onto the platform in abutting relation to said block, a spring-controlled hook-member movable on the platform for pressing beets to stationary position thereon, a carrier-bar mounted on the spindle, a pair of spring-controlled knife-members movable with the carrier-bar for removing tops from the beets, each knife-member having a beet-top engaging claw-member moving therewith.

RICHARD P. COLWILL.